United States Patent [19]
Helm

[11] 4,083,585
[45] Apr. 11, 1978

[54] TUBE COUPLING

[75] Inventor: Homer E. Helm, Troy, Mich.

[73] Assignee: Gordon H. Cork, Birmingham, Mich.

[21] Appl. No.: 741,236

[22] Filed: Nov. 12, 1976

[51] Int. Cl.$^2$ ............................................. F16L 31/00
[52] U.S. Cl. ................................. 285/260; 24/131 C; 279/76; 279/96; 285/318; 285/348; 285/403; 285/423
[58] Field of Search ............... 285/248, 256, 244, 116, 285/259, 251, 318, 305, 376, 260, 238, 423, 403, 348; 403/291, 229, 373; 24/131 C, 115 R; 279/76, 79, 96, 102

[56] References Cited

U.S. PATENT DOCUMENTS

| | | | |
|---|---|---|---|
| 1,982,732 | 12/1934 | Fletcher | 285/305 X |
| 2,032,196 | 2/1936 | Blake | 285/305 X |
| 2,711,331 | 6/1955 | Temple | 285/305 X |
| 3,856,336 | 12/1974 | Karcher | 285/318 |

Primary Examiner—Dave W. Arola
Attorney, Agent, or Firm—Barnes, Kisselle, Raisch & Choate

[57] ABSTRACT

A releasable tube coupling wherein the tube is releasably retained in the coupling body by means of a coil spring which embraces the outer cylindrical surface of the tube. In the relaxed condition, the spring has an inner diameter less than and frictionally engages the outer diameter of the tube. When an axial outward force is applied to the tube the spring tends to contract as it elongates and more firmly grips the tube. The spring is axially compressible to insert the tube in the fitting body and to release it therefrom.

15 Claims, 3 Drawing Figures

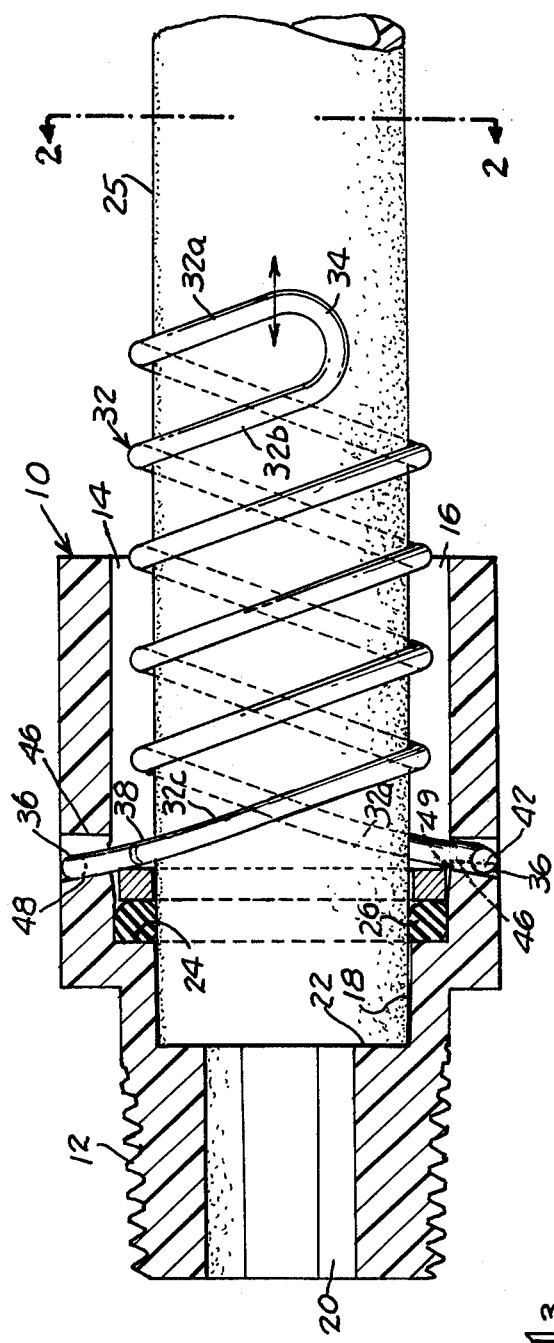
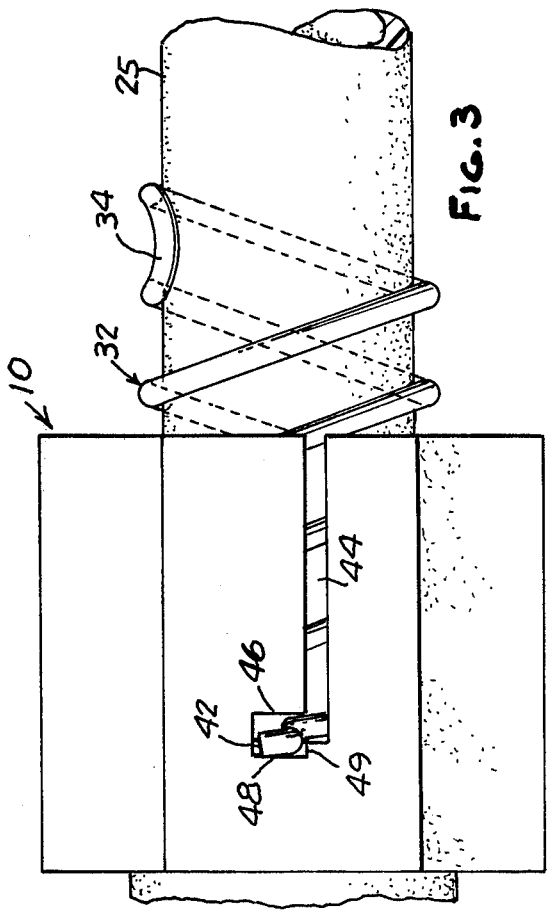
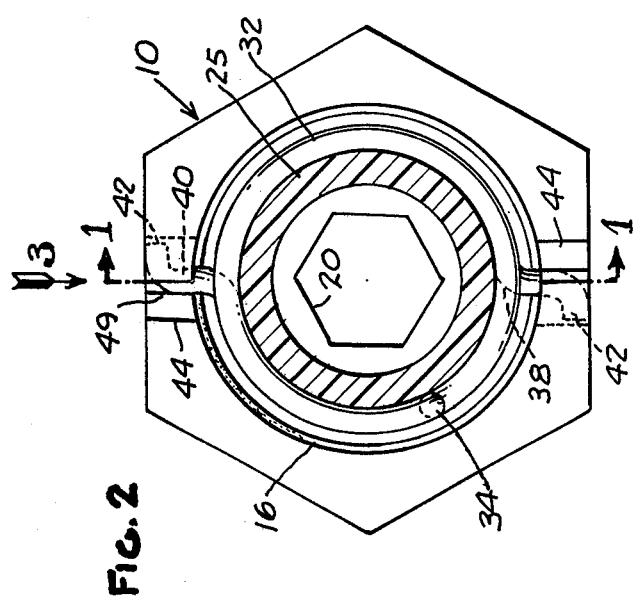

TUBE COUPLING

This invention relates to a releasable, fluid-tight coupling for metal and at least semi-rigid plastic tubes.

In many industrial applications and consumer products metal or semi-rigid plastic tubing is employed for conducting fluids under pressure to and from fluid-operated devices. The tubing is connected to the supply source of the fluid and to the operated device by means of couplings. From the standpoint of operation it is important that the couplings are fluid-tight; from the standpoint of servicing it is important that the tubing is adapted to be easily and readily connected to and disconnected from the coupling.

It is an object of this invention to provide a coupling of the type described which meets the aforementioned practical requirements and which, at the same time, is designated so that it can be manufactured economically.

More specifically, the coupling of this invention employs a coupling body in which the end of a tube is sealed and retained therein by means of a coil spring which is adapted to tightly embrace the outer cylindrical surface of the tube. One end of the spring is secured within the coupling body. In the relaxed condition the inner diameter of the spring is slightly smaller than the outer diameter of the tube. The tube is inserted through the spring or released therefrom by simply compressing the spring axially to enlarge the inner diameter thereof.

Other objects, features and advantages of the present invention will become apparent from the following description and accompanying drawing, in which:

FIG. 1 is a longitudinal sectional view taken along the line 1—1 in FIG. 2 and showing a coupling constructed in accordance with the present invention;

FIG. 2 is a sectional view taken along the line 2—2 in FIG. 1; and

FIG. 3 is a fragmentary plan view of the coupling as viewed in the direction of the arrow 3 in FIG. 2.

The coupling according to the present invention includes a body 10 formed of metal or molded plastic for economical production and having a threaded portion 12 at one end by means of which the coupling is adapted to be connected to a fluid-operated device. Adjacent the threaded portion 12 the outer periphery of body 10 may be of hexagonal shape to facilitate rotating the coupling body when desired. Body 10 is centrally bored as at 14. Bore 14 comprises three sections 16, 18, 20 of progressively increasing diameter. This intermediate section 18 is connected with the smaller bore section 20 by means of an annular inwardly extending shoulder 22 and is connected with the larger bore section 16 by an annular radially outwardly extending shoulder 24. In the embodiment illustrated bore section 20 is of hexagonal shape to facilitate the interengagement thereof with a tool for turning the coupling body, particularly if the coupling body is of circular cross section.

The tube used with the coupling is designated 25 and can be formed of metal or of plastic which is at least semi-rigid so that it will not easily collapse. Bore 18 has a diameter such as to freely receive the end of tube 25. A rubber O-ring 26 or other elastomeric seal is located in bore 16 adjacent shoulder 24 and embraces the outer surface of tube 25 so as to provide a sealed connection therewith in a conventional manner. As shown in FIG. 1, bore 16 may be ensmalled slightly adjacent shoulder 24 to provide a cylindrical land 28 which forms a seat for O-ring 26 and which is connected with the larger diameter of bore section 16 by a conical surface 30 to prevent damage to the O-ring.

Tube 25 is adapted to be releasably locked in coupling body 10 by means of a coil spring 32. Spring 32 has a uniform inner and outer diameter and is formed as a double helix. The two coils 32a and 32b at one end of the spring are interconnected by a continuous loop 34. The two coils 32c and 32d at the opposite end of the spring terminate as the free ends 36 of the wire from which the spring is formed. In the relaxed condition the inner diameter of spring 32 is slightly smaller than the outer diameter of tube 25 so that the spring will tightly embrace the tube.

In accordance with the present invention it is necessary that spring 32 and body 10 are constructed so that the spring can be releasably interlocked with the body. Accordingly, the two ends 36 of the spring coils are arranged so that they will terminate at diametrically opposite points and are bent radially outwardly as at 38 to form a pair of diametrically opposite, radially extending fingers 40. The free ends of fingers 40 are bent circumferentially in opposite directions to form locking tabs 42.

In order to facilitate the interengagement of spring 32 and body 10 the body is formed on a pair of diametrically opposite sides thereof with axially extending slots 44. At their inner ends slots 44 are fashioned with circumferential extensions 46. The closed end of each slot extension 46 is formed with an axially tapered or inclined side wall 48 at one side thereof which forms a shoulder 49 with the inlet end portion of the slot extension. The tapered side walls 48 have a circumferential dimension sufficient to form pockets for accommodating the locking tabs 42 in a seated position within the confines of body 10. To interengage spring 32 with body 10 the spring is oriented axially with respect to body 10 so that the fingers 40 are aligned with slots 44. The spring is then inserted axially into body 10 until fingers 40 engage the ends of slots 44. The fingers 40 are flexed slightly to align them with slot extensions 46 and the spring is then rotated clockwise relative to body 10 so that fingers 40 are shifted circumferentially into the slot extensions 46 until they snap behind the hooked formations provided by the return bent shoulders 49 and engage the inclined side walls 48. When the spring is so engaged with the body it can be removed therefrom only by first flexing locking tabs 42 axially inwardly to align fingers 40 with the entrance portions of slot extensions 46, rotating the spring counterclockwise, and then withdrawing it axially from within the body. It will be noted that a metal or plastic ring or washer 50 is interposed between O-ring 26 and the inner end of spring 32. The provision of such a ring or washer is desirable since the inner end coils of spring 32 present a discontinuous, axially facing bearing surface and the effective sealing action of O-ring 26 is obtainable only when the O-ring is backed up by a substantially continuous annular flat surface.

The end of spring 32 formed with the closed loop 34 extends outwardly beyond the adjacent end of the body 10. The spring is formed of such length so that the looped end 34 is readily accessible, either manually or with a tool. The accessibility of this end of the spring is desirable both from the standpoint of engaging tube 10 with the coupling and releasing it therefrom. Keeping in mind that, in the relaxed condition, the inner diameter of spring 32 is slightly smaller than the outer diameter of tube 25, it is obvious that the spring has to be enlarged slightly in order to insert the tube 25 therein. With the present arrangement this is accomplished by merely aligning the end of the tube with the looped end 34 of the spring and then pressing the tube against the end of the spring in a direction toward the coupling. This axial pressure on the spring causes it to compress axially and, in so doing, enlarges the inner diameter of the spring so as to accommodate the tube 25. In this manner the tube can be inserted into the spring and into the body 10 so that the end thereof is received within the bore section 18 and abuts against annular shoulder 22. When the tube is so arranged within the coupling it is effectively sealed and locked therein. O-ring 26 effectively prevents the escape of fluid from between the tube and the coupling body. At the same time the tube is tightly embraced by spring 32 to retain it in place. The spring in turn is securely locked to body 10 by means of the fingers 40 in the hooked slots. An outward pull on the tube merely tends to cause the spring 32 to more tightly embrace the tube. When it is desired to remove the tube from the coupling, the looped end 34 of the spring is pushed manually or with a tool to compress the spring axially. This causes the spring to circumferentially enlarge, and, thus, permit withdrawal of the tube therefrom.

It will be appreciated that the invention is not only applicable to the straight coupling illustrated but to numerous other types of couplings, such as tees, elbows, crosses, etc., and even multiple outlet fittings.

I claim:

1. A releasable tube coupling comprising a body having a bore extending axially therethrough, said bore having an open end for receiving said tube, a coil spring extending coaxially in said bore and projecting outwardly at said open end thereof, means releasably interengaging the inner end of said spring with said body to prevent axial displacement of said inner end of the spring relative to said body, an annular seal disposed in said bore beyond said inner end of the spring, said seal sealingly engaging the wall defining said bore and adapted to encircle and seal with the outer surface of the end portion of a tube telescoped into said bore, said spring in the relaxed position thereof having an outer diameter smaller than said bore and having an inner diameter slightly smaller than the outer diameter of the tube and being axially compressible to enlarge the inner diameter thereof by axially displacing the outer end of the spring toward said body to enable insertion of the tube through and its withdrawal from within said spring.

2. A coupling as called for in claim 1 wherein said seal comprises an O-ring.

3. A coupling as called for in claim 2 including a rigid ring disposed between said O-ring and the inner end of said spring.

4. A coupling as called for in claim 1 wherein the outer diameter of the spring when compressed is smaller than the diameter of said bore.

5. A coupling as called for in claim 4 wherein said spring comprises a double helix, the outer end of said spring being defined by a closed loop connecting the two end coils of said double helix.

6. A coupling as called for in claim 5 wherein the two coils at the inner end of said double helix terminate in free ends, each of said free ends being interconnected with said body to prevent axial displacement thereof.

7. A coupling as called for in claim 6 wherein said free ends comprise radially outwardly directed fingers.

8. A coupling as called for in claim 7 wherein said body has a pair of apertures therein extending into said bore, said fingers extending through said apertures.

9. A coupling as called for in claim 8 wherein the two fingers are diametrically opposed and the two apertures in the body are correspondingly diametrically opposed.

10. A coupling as called for in claim 9 wherein said apertures extend radially through the wall of the body defining said bore.

11. A coupling as called for in claim 10 wherein the free ends of said fingers are bent circumferentially in opposite directions and are seated within pockets in the outer surface of said body adjacent said apertures.

12. A coupling as called for in claim 10 wherein said body is provided with a pair of diametrically opposite slots extending axially from said apertures to the end of said body corresponding to the open end of said bore.

13. A coupling as called for in claim 12 wherein said apertures are displaced circumferentially from the inner end of said slots and are connected therewith by circumferentially extending slot extensions.

14. A coupling as called for in claim 13 wherein each aperture has a side wall inclined axially inwardly in a radially outwardly direction which forms a shoulder with the slot extension behind which the free end of the spring is engaged.

15. A coupling as called for in claim 14 wherein said slots, said apertures and said slot extensions are shaped such that the spring can be removed from within said body by first flexing the free ends of the spring in a direction axially outwardly of the body to disengage said free ends from behind said shoulders, then rotating the spring through said slot extensions in a counterclockwise direction to align said fingers with said slots and thereafter withdrawing the spring through the open end of said bore.

* * * * *